US006920192B1

(12) United States Patent
Laroia et al.

(10) Patent No.: US 6,920,192 B1
(45) Date of Patent: Jul. 19, 2005

(54) ADAPTIVE ANTENNA ARRAY METHODS AND APPARATUS FOR USE IN A MULTI-ACCESS WIRELESS COMMUNICATION SYSTEM

(75) Inventors: Rajiv Laroia, Basking Ridge, NJ (US); Sundeep Rangan, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 837 days.

(21) Appl. No.: 09/631,805

(22) Filed: Aug. 3, 2000

(51) Int. Cl.[7] ................................................. H04L 1/06

(52) U.S. Cl. ...................................... 375/347; 370/342

(58) Field of Search ................................. 370/320–321, 370/335, 337, 344, 347, 441–442, 208, 210, 342; 455/63.1, 62, 63.4, 65, 132, 133–135, 272, 561, 562.1, 517, 575.7; 342/367–368, 372, 373, 385, 378, 380; 375/347, 267, 348, 349, 285

(56) References Cited

U.S. PATENT DOCUMENTS

| | | | | | |
|---|---|---|---|---|---|
| 4,998,290 | A | * | 3/1991 | Olenick et al. | 455/509 |
| 5,854,612 | A | * | 12/1998 | Kamiya et al. | 342/383 |
| 6,006,110 | A | * | 12/1999 | Raleigh | 455/561 |
| 6,064,338 | A | * | 5/2000 | Kobayakawa et al. | 342/378 |
| 6,240,149 | B1 | * | 5/2001 | Yukitomo et al. | 375/347 |
| 6,480,153 | B1 | * | 11/2002 | Jung et al. | 342/368 |
| 6,509,872 | B2 | * | 1/2003 | Ishii et al. | 342/383 |
| 6,597,678 | B1 | * | 7/2003 | Kuwahara et al. | 370/342 |
| 6,647,276 | B1 | * | 11/2003 | Kuwahara et al. | 455/562.1 |

FOREIGN PATENT DOCUMENTS

GB        2265053 A  *  9/1993  ............ H01Q/3/26

OTHER PUBLICATIONS

Don Torrieri and Kesh Bakhru, "Adaptive and Diversity Arrays for Frequency–Hopping Systems", Military Communications Conference Proceedings, 1999, MILCOM 1999, IEEE, vol.: 2, Oct. 31–Nov. 3, 1999, pp.: 929–933.*

Kesh Bakhru and Avi Krieger, Spatial Acquisition of Wideband Frequency–Hopping Signals Using Adaptive Array Processing, 1988, IEEE, pp. 0375–0380.*

Don Torrieri and Kesh Bakhru, An Anticipative Adaptive Array For Frequency Hopping Communications, Jul., 1998, IEEE, vol. 24, No. 4, pp. 449–456.*

(Continued)

*Primary Examiner*—Tesfaldet Bocure
*Assistant Examiner*—Khanh Tran

(57) ABSTRACT

Adaptive antenna array techniques for use in an orthogonal frequency division multiplexed spread-spectrum multi-access (OFDM-SSMA) cellular wireless system or other type of wireless communication system. A base station of the system includes an antenna array and a base station receiver. The base station receiver implements an adaptive antenna gain algorithm which estimates a spatial covariance matrix for each of K mobile stations communicating with the base station. The spatial covariance matrix for a given one of the mobile stations is determined at least in part based on a unique hopping sequence of the mobile station, and provides a correlation between signals received from the mobile station at different antenna elements within the antenna array. An average spatial covariance matrix for a set of received signals is also generated. The individual spatial covariance matrices and the average spatial covariance matrix are processed to generate an estimate of an interference matrix for the K mobile stations, and the estimate of the interference matrix is further processed to generate array responses for each of the mobile stations. The array response for a given mobile station is processed to determine an antenna weighting which is applied to a signal received from the given mobile station in order to facilitate detection of a corresponding transmitted symbol.

20 Claims, 5 Drawing Sheets

OTHER PUBLICATIONS

Kesh Bakhru and Don Torrieri, The Maximin Algorithm for Adaptive Arrays and Frequency–Hopping Communications, Sep., 1984, IEEE, vol. AP–32, No. 9, pp. 919–928.*

Klaus Hugl, Juha Laurila and Ernst Boneck, Downlink Beamforming for Frequency Division Duplex Systems, 1999, IEEE, Globecom '99, pp. 2097–2101.*

Faik Eken, Use of Antenna Nulling With Frequency–Hopping Against Follower Jammer, Sep., 1991, IEEE, vol. 39 No. 9, pp. 1391–1397.*

Chan Kyu Kim, Songin Choi, Yong Soo Cho, Adaptive BeamForming For An OFDM System, 1999, IEEE, pp. 484–488.*

J.C. Liberti and T.S. Rappaport, "Analytical Results for Capacity Improvements in CDMA," IEEE Transactions on Vehicular Technology, vol. 43, No. 3, pp. 680–690, 1994.

J.H. Winters et al., "The Impact of Antenna Diversity on the Capacity of Wireless Communication Systems," IEEE Transactions on Communications, vol. 42, No. 2/3/4, pp. 1740–1751, 1994.

Z. Rong et al., "Simulation of Multitarget Adaptive Array Algorithms for Wireless CDMA Systems," Proc. of the IEEE Vehicular Technology Conference, pp. 1–5, 1997.

G.E. Bottomley and K. Jamal, "Adaptive Arrays and MLSE Equalization," Proc of the IEEE Vehicular Technology Conference, pp. 50–54, 1995.

J.H. Winters, "Signal Acquisition and Tracking with Adaptive Arrays in the Digital Mobile Radio System IS–54 with Flat Fading," IEEE Transactions on Vehicular Technology, vol. 42, No. 4, pp. 377–384, 1993.

* cited by examiner

ADAPTIVE ANTENNA ARRAY METHODS AND APPARATUS FOR USE IN A MULTI-ACCESS WIRELESS COMMUNICATION SYSTEM

FIELD OF THE INVENTION

The present invention relates generally to wireless communication systems, and more particularly to multi-access wireless communication systems that include base stations having adaptive antenna arrays.

BACKGROUND OF THE INVENTION

It is well known that adaptive antenna arrays offer the potential for significant capacity improvements in interference-limited cellular wireless systems. See, e.g., J. Liberti, T. Rappaport, "Analytical results for capacity improvements in CDMA", IEEE Transactions on Vehicular Technology, vol. 43, pp. 680–690, 1994, and J. Winters et al., "The impact of antenna diversity on the capacity of wireless communication systems," IEEE Transactions on Communications, vol. 42, pp.1740–1751, 1994.

In cellular wireless systems with adaptive antenna arrays, the multiple antennas of the array are typically deployed at the base station of each cell, and the signals transmitted or received by the antennas are linearly combined with certain complex weights. Different antenna weights are used to extract the signals transmitted to or received from different mobile stations within the cell. By properly adjusting the antenna weights, the multiple antennas can improve the signal-to-interference ratio (SIR) through beamforming, interference cancellation and receive diversity. However, realizing such capacity improvements demands proper adaptation of the antenna weights, and developing suitable adaptation algorithms can be a challenging problem in modem wireless systems with high mobility or bursty data traffic.

Several antenna array algorithms have been developed for traditional wireless technologies, such as code division multiple access (CDMA) and time division multiple access (TDMA). The key to any adaptive antenna array algorithm is for the base station to first isolate the signals from each mobile station within the cell, and then tune the antenna weights to capture those signals.

In CDMA systems, the signals from the mobile stations can be isolated by their unique spreading codes, as described in, e.g., Z. Rong et al., "Simulation of multitarget adaptive antenna algorithms," Proc. Vehicular Technology Conference, pp. 1–5, 1997.

For TDMA systems, the signal from each mobile station arrives in a unique time slot. Additionally, in TDMA standards such as IS-54 and IS-136, a known synchronization sequence within each time slot can also be exploited for antenna adaptation. See, e.g., G. Bottomley and K. Jamal, "Adaptive antenna arrays and MLSE equalization," Proc. Vehicular Technology Conference, pp. 50–54, 1995, and J. Winters, "Signal Acquisition and tracking with adaptive antenna arrays in the digital mobile radio system IS-54 with flat fading," IEEE Transactions on Communications, vol.42, pp.377–384, 1993.

Unfortunately, similar adaptive antenna algorithms have not been developed for cellular wireless systems based on orthogonal frequency division multiplexing with spread-spectrum multi-access (OFDM-SSMA). OFDM-SSMA is a novel technology for cellular wireless systems that is described in U.S. patent application Ser. No. 09/267,471, entitled "Orthogonal frequency division multiplexing based spread spectrum multiple access," and U.S. patent application Ser. No. 09/266,370, entitled "Orthogonal frequency division multiplexing based spread spectrum multiple access," both filed Mar. 11, 1999 in the name of inventors R. Laroia, J. Li and M. Vanderveen, and incorporated by reference herein.

In OFDM-SSMA, both the uplink and downlink bandwidth are divided into a number of equally spaced tones that are re-used in all cells. Each mobile station is allocated one or more of these tones, with different mobile stations in the same cell using different tones. For frequency diversity and interference averaging, the tones assignments are changed, or hopped, from symbol to symbol. OFDM-SSMA offers the benefits of traditional OFDM such as resistance to delay spread along with other benefits such as in-cell orthogonality, universal frequency re-use and frequency diversity.

Adaptive antenna algorithms for traditional multi-access technologies such as CDMA and TDMA cannot be easily adapted to OFDM-SSMA. Since OFDM-SSMA does not use code division or time division multiple access, the signals from the mobile stations cannot be isolated by any unique spreading code or time slot. In addition, signals from OFDM-SSMA mobile stations do not typically contain any training symbols or pilots. Therefore, the IS-54 and IS-136 pilot-based methods mentioned above cannot be used in OFDM-SSMA without adding additional training symbols. Also, since OFDM-SSMA signals are inherently frequency hopping, the channel is constantly changing. However, traditional adaptive algorithms usually require channel coherence over the training period. Consequently, if the benefits of antenna arrays are to be realized for OFDM-SSMA systems, new adaptive antenna algorithms must be developed.

SUMMARY OF THE INVENTION

The present invention provides methods and apparatus for adapting antenna arrays in an uplink channel of an OFDM-SSMA wireless system or other type of wireless system. In accordance with one aspect of the invention, an adaptive antenna algorithm is provided in which a base station of the system determines a spatial covariance matrix for each mobile station communicating with that base station. The spatial covariance matrices describe the correlation between signals received from the mobile stations at different antennas within the array. Array response vectors to the mobile station signals can be determined from the spatial covariance matrices via a computationally efficient method. An appropriate antenna weighting for each mobile station may then be generated from the array response vectors.

In an illustrative embodiment of the invention, a base station receiver implements an adaptive antenna algorithm which estimates a spatial covariance matrix for each of K mobile stations communicating with the base station. The spatial covariance matrix for a given one of the mobile stations is determined at least in part based on a unique hopping sequence of the mobile station, and provides a correlation between signals received from the mobile station at different antenna elements within the antenna array. An average spatial covariance matrix for a set of received signals is also generated. The individual spatial covariance matrices and the average spatial covariance matrix are processed to generate an estimate of an interference matrix for the K mobile stations, and the estimate of the interference matrix is further processed to generate array responses for each of the mobile stations. The array response for a given mobile station is used to generate an antenna weighting which is applied to a signal received from the given mobile station in order to facilitate detection of a corresponding transmitted symbol.

Advantageously, an adaptive antenna algorithm in accordance with the invention does not require any pilot symbols or decision feedback. Also, while such an algorithm may assume that the directions of arrivals of the mobile stations are slowly changing, the channel itself can change arbitrarily from symbol to symbol. Consequently, the algorithm is well suited to fast fading and frequency hopping OFDM wireless channels. Furthermore, the computations in the adaptive antenna algorithm of the present invention may be performed jointly for all mobile stations in the cell. In addition to reducing the computational costs, joint processing improves the convergence of the algorithm.

DETAILED DESCRIPTION OF THE INVENTION

The present invention will be illustrated below in conjunction with an exemplary multiple access wireless communication system based on orthogonal frequency division multiplexing and spread-spectrum multi-access (OFDM-SSMA). It should be understood, however, that the invention is not limited to use with only this particular type of wireless communication system.

Figure 1:
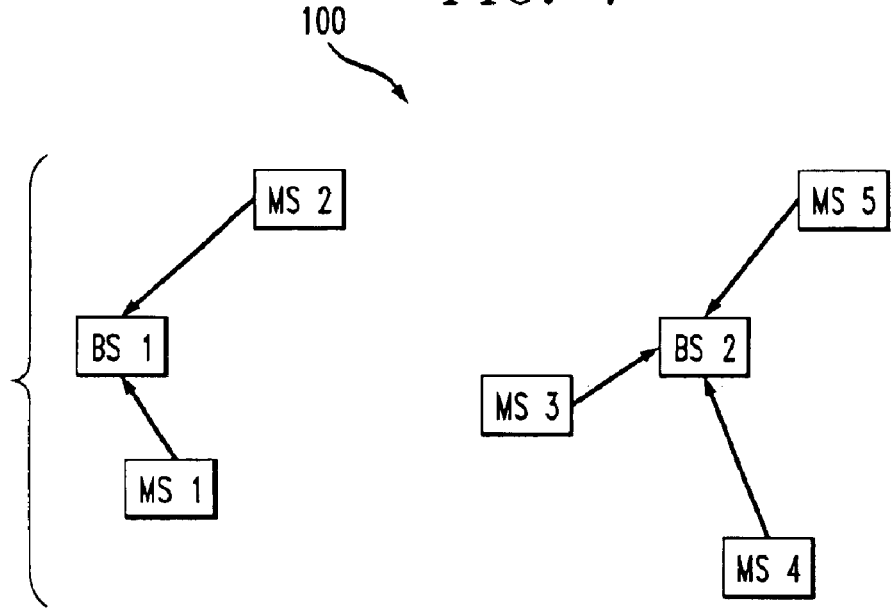
FIG. 1 shows a portion of a cellular wireless system in which the present invention may be implemented.

FIG. 1 shows a portion of a cellular wireless system 100 in which the present invention may be implemented. The cellular wireless system 100 comprises a number of base stations and mobile stations. Each base station has a fixed location and communicates with one or more mobile stations in a surrounding geographic territory commonly known as a cell. As mobile stations move within the system, the mobile stations may pass from a cell associated with one base station to a cell associated with another base station. The portion of the system 100 shown in FIG. 1 includes two base stations, denoted BS 1 and BS 2, and five mobile stations, denoted MS 1, MS 2, MS 3, MS 4 and MS 5. In this example, MS 1 and MS 2 are currently communicating with BS 1 and MS 3, MS 4 and MS 5 are currently communicating with BS 2. The figure shows only the uplink, i.e., the transmissions from the mobile stations to the base stations.

The mobile stations communicating with a given base station are called the "in-cell" mobile stations for that base station. The other mobile stations are called "out-of-cell" mobile stations. In the example in FIG. 1, MS 1 and MS 2 are in-cell mobile stations for BS 1, and MS 3, MS 4 and MS 5 are out-of-cell mobile stations for BS 1. A base station receives signals from both in-cell and out-of-cell mobile stations, with varying signal strengths. The transmissions from out-of-cell mobile stations act as interference to the transmissions from the in-cell mobile stations. Consequently, the out-of-cell mobile stations are sometimes referred to as "interfering" mobile stations.

Figure 2:
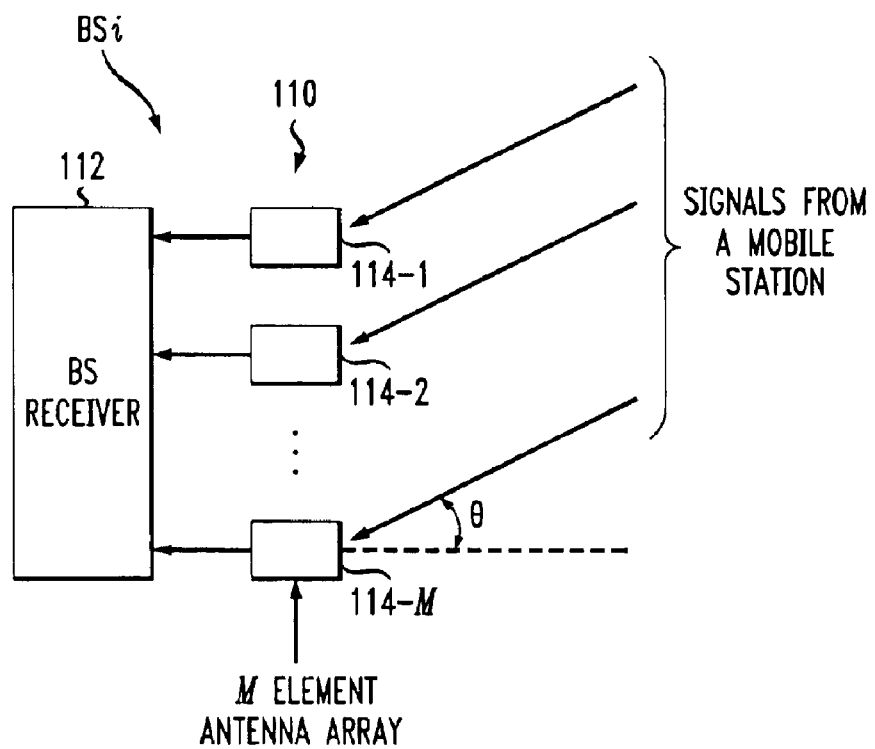
FIG. 2 shows an example of a cellular wireless system base station that incorporates an adaptive antenna array.

FIG. 2 shows a more detailed view of a given one of the base stations BS i of the cellular wireless system 100 of FIG. 1. The base station BS i includes an antenna array 110 coupled to a base station receiver 112. The antenna array 110 includes a set of M antenna element 114-1, 114-2, ... 114-M. These antenna elements are typically positioned close to one another. Signals from each mobile station, whether in-cell or out-of-cell, may arrive on all M antenna elements of the antenna array 112. Neglecting angle spread, the signals from a given mobile station arrive with a common angle$\theta$, called the direction of arrival, as is illustrated in FIG. 2. The direction of arrival is dependent on the position of the given mobile station relative to the base station. Different mobile stations will therefore have different direction of arrivals. The base station receiver 112 combines the signals from the antenna elements 114 to amplify signals with certain directions of arrivals while rejecting signals from other direction of arrivals. Adaptation of the antenna array 110 can thus be used to amplify signals from the in-cell mobile stations while rejecting the signals from interfering out-of-cell mobile stations.

Figure 3:
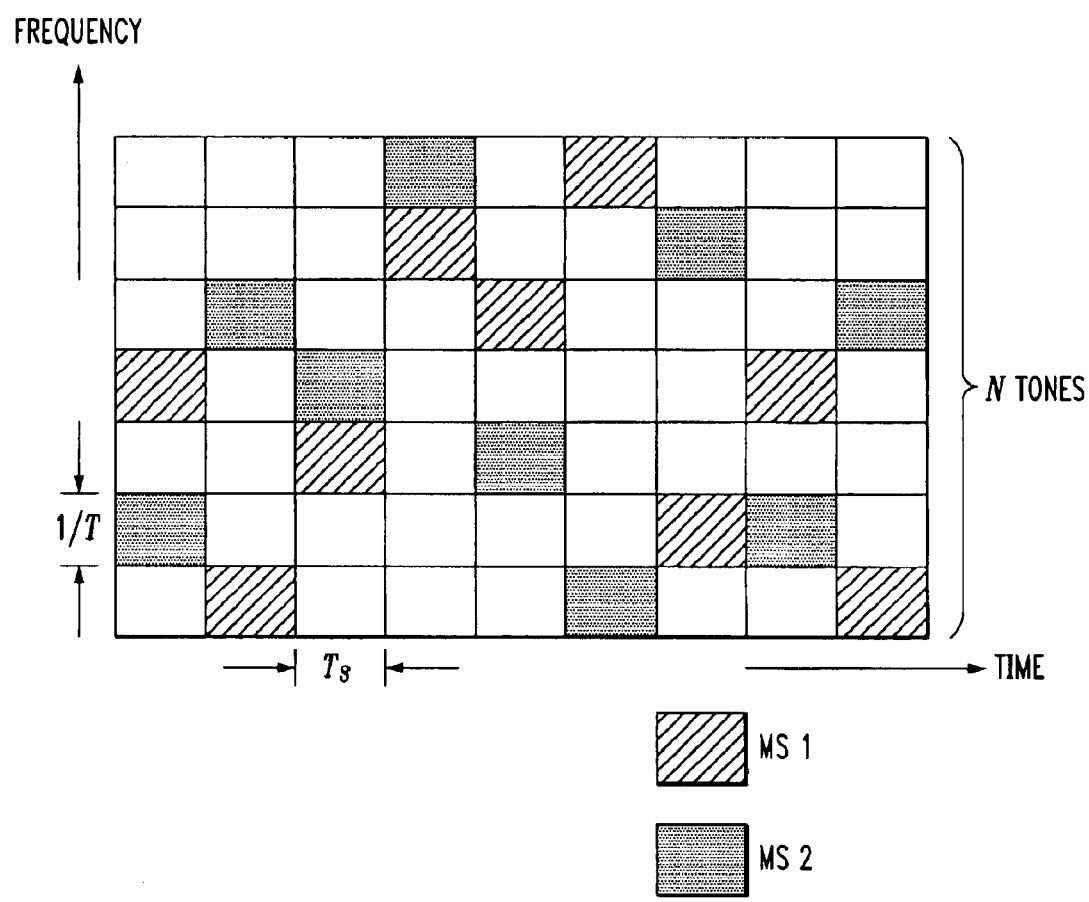
FIG. 3 illustrates the operation of an example uplink channel in an orthogonal frequency division multiplexing with spread-spectrum multiple access (OFDM-SSMA) cellular wireless system in which the present invention may be implemented.

FIG. 3 illustrates the operation of an example uplink channel in an orthogonal frequency division multiplexing with spread-spectrum multi-access (OFDM-SSMA) cellular wireless system. In an OFDM-SSMA system, the uplink channel for each base station is divided into symbol periods of duration $T_S$, with each symbol period carrying data on N orthogonal tones. The tones are spaced uniformly in frequency with frequency spacing 1/T, where T is a parameter called the fundamental tone period. In each base station, all the in-cell mobile stations share the uplink channel. Each mobile station transmits data on one tone in each symbol period, with no two mobile stations in the cell using the same tone in the same symbol period. One complex symbol can be transmitted on each tone in each OFDM symbol period.

For frequency diversity and interference averaging, the tones used by each mobile station are changed, or "hopped," from symbol to symbol. The assignment of tones as a function of time is called the "hopping sequence." In the remainder of the description, the number of mobile stations communicating with a given base station will be denoted by K. The hopping sequence for the uplink channel of an OFDM-SSMA base station will be represented by a function, $\sigma(t,k)$, denoting the tone number for the k-th mobile station in the t-th symbol period. Each mobile station generally has a unique hopping sequence.

In the example of FIG. 3, the uplink channel has N=7 tones, which are shared by K=2 two mobile stations, denoted MS 1 and MS 2. The hatched regions indicate the tones used by MS 1, and the solid regions indicate the tones used by MS 2. The other tones are not used in this example. Both MS 1 and MS 2 use one tone per symbol period.

Figure 4:
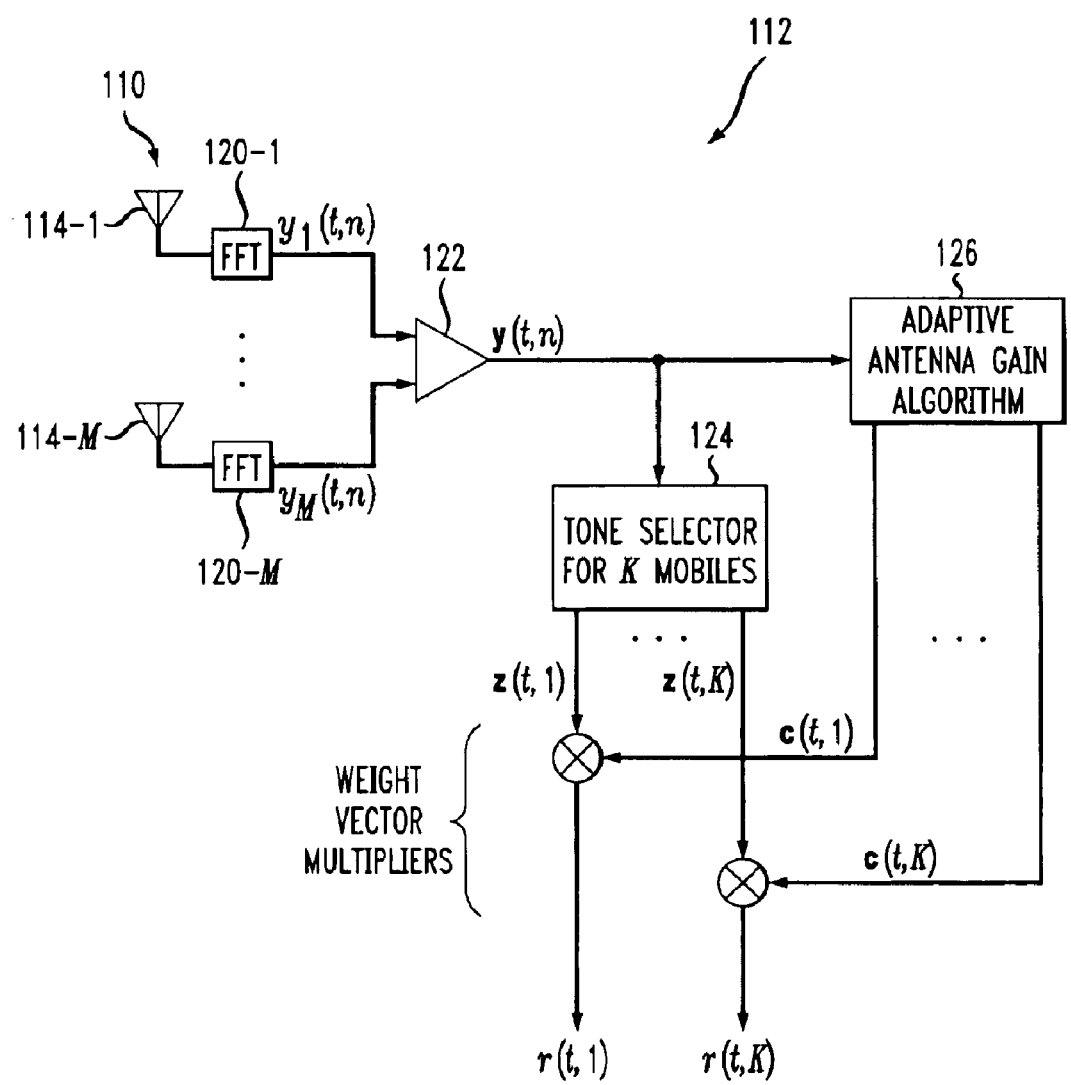
FIG. 4 shows an OFDM-SSMA base station receiver with an antenna array and linear combining in which the present invention may be implemented.

FIG. 4 shows a standard OFDM-SSMA base station receiver 112 with antenna array 110 and linear combining, in which an adaptive antenna algorithm in accordance with the present invention may be implemented. The received signals from each of the M antenna elements 114 are first applied to corresponding Fast Fourier Transform (FFT) units 120 which extract the frequency-domain signals $y_m(t,n)$, $m=1, \ldots, M$. Here, $y_m(t,n)$ denotes the complex symbol received on the n-th tone in the t-th symbol period on the m-th antenna element. Pre-processing for downconversion to baseband, synchronization and other standard OFDM routines are not depicted in the figure, and are described in greater detail in the above-cited OFDM-SSMA U.S. Patent Applications.

The signals from the M antenna elements 114 are multiplexed in signal combiner 122 to form the received vector, $$y(t,n)=[y_1(t,n) \ldots y_M(t,n)]^T.$$

Under a standard channel model, the received vector, y(t,n), can be written $$y(t, n) = \begin{cases} h(t, k)u(t, k) + w(t, n) & \text{if } n = \sigma(t, k) \\ w(t, n) & \text{if } n \neq \sigma(t, k) \text{for all } k, \end{cases} \quad (1)$$

where, in the first case, the n-th tone is used by the k-th mobile station. The vector h(t,k) is the transfer function from the mobile station to the base station, u(t,k) is the complex scalar symbol transmitted by the mobile station, and w(t,n) is the interference vector on the n-th tone. In the second case, the tone is not used by any mobile station, and the base station only hears the interference w(t,n). The interference is due to the signals received from out-of-cell mobile stations. Neglecting angle spread, the transfer function vector h(t,k) can be written $$h(t,k)=g(t,k)a(\theta_k), \quad (2)$$

where $a(\theta_k)$ is the vector array response to the k-th mobile station, whose direction of arrival is denoted $\theta_k$. The term g(t,k) is a time-varying scalar channel gain. The mobile station angular position $\theta_k$ is slowly varying, while the channel gain g(t,k) can vary from symbol to symbol due to fading and frequency hopping.

Referring again to FIG. 4, a tone selector block 124 selects the appropriate tone sequence for each of the K mobile stations. The signals z(t,k) denote the received vector for the k-th mobile station in the t-th symbol period. Since the tone for the k-th mobile station in the t-th symbol period is given by $\sigma(k,t)$, $$z(t,k)=y(t,\sigma(t,k)), k=1, \ldots, K.$$

The base station receiver 112 of FIG. 4 uses linear combining in receiving the mobile station data from the multi-antenna signals. In linear combining, an adaptive antenna gain algorithm unit 126 selects, for the k-th mobile station, a vector c(t,k) of the M complex weights. The base station multiplies the vector signal z(t,k) by the weight vector c(t,k) to obtain the scalar signal, $$r(t, k) = c(t, k)^* z(t, k) = \sum_{m=1}^{M} c_m(t, k)^* z_m(t, k),$$

where * denotes conjugate transpose, so that $c(t,k)^*z(t,k)$ is the inner-product between the complex vectors c(t,k) and z(t,k).

The signals r(t,k) are then passed on to the remainder of the base station receiver 112. For each mobile station k, the base station attempts to estimate the transmitted symbols, u(t,k), from scalar signal r(t,k).

Figure 5:
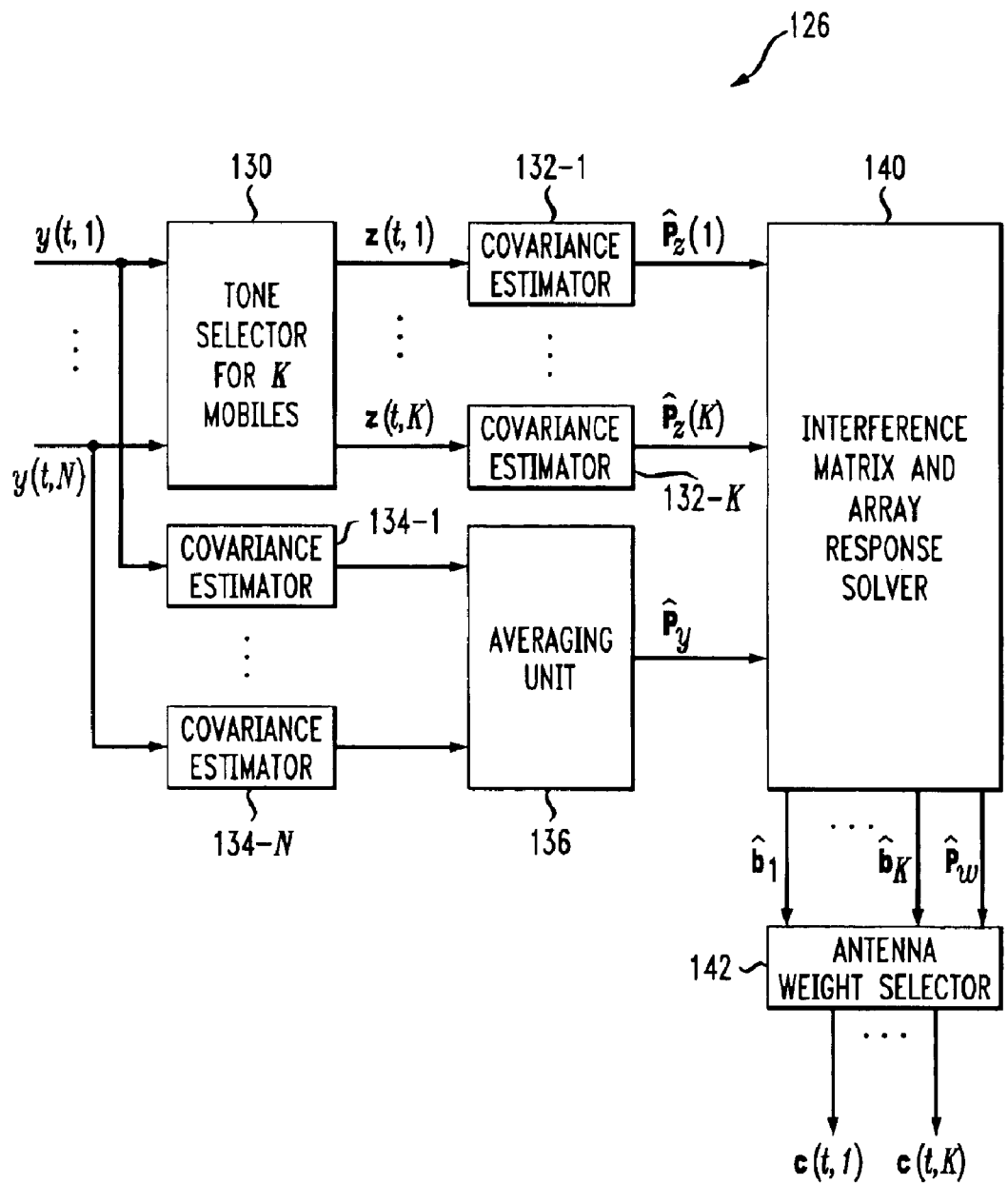
FIG. 5 is a block diagram of an adaptive antenna algorithm unit in accordance with an illustrative embodiment of the present invention.

FIG. 5 shows a more detailed view of the adaptive antenna gain algorithm unit 126 in the base station receiver 112 of FIG. 4. The adaptive antenna gain algorithm unit 126 implements an adaptive antenna algorithm in accordance with an illustrative embodiment of the invention. Using the notation described previously, the goal of the adaptive antenna algorithm is to set the weight vectors c(t,k) such that the transmitted symbols u(t,k) can be easily detected from the weighted received signal r(t,k). A standard figure of merit to evaluate a candidate weight vector c(t,k) is the resulting signal-to-interference ratio (SIR). If u(t,k) and g(t,k) in equations (1) and (2) are independent with variances $\sigma_u^2$ and $\sigma_g^2$, respectively, then a weight vector c(t,k) will result in an average SIR for the k-th mobile station of $$SIR_k = \frac{|c(t, k)^* b_k|^2}{c(t, k)^* P_w c(t, k)}, \quad (3)$$

where $$b_k = \sigma_u \sigma_g a(\theta_k),$$

$$P_w = Ew(t, \sigma(k, t))w^*(t, \sigma(k, t)) = \frac{1}{N}\sum_{n=1}^{N} Ew(t, n)w^*(t, n), \quad (4)$$

and E denotes expectation. The vector $b_k$ will be referred to herein as the "scaled vector array response" for the k-th mobile station and $P_w$ is an M×M interference "spatial covariance matrix." Here, the term "spatial" is used to indicate that the matrix $P_w$ provides the statistical correlation of the interference of antenna elements in different spatial locations. The interference covariance is averaged over the hopping sequence assuming that at each time t, $\sigma(t,k)$ is uniformly distributed from 1 to N, and the interference covariance is time-invariant. Thus, $SIR_k$ represents an average SIR seen over the hopping cycle.

The adaptive antenna gain algorithm unit 126 system in FIG. 5 attempts, for each mobile station k, to find a weight vector c(t,k) that maximizes the average SIR for the k-th mobile station. Given a scaled array response $b_k$ and a spatial interference covariance matrix $P_w$, the weight vector that results in a maximal SIR is given by $$c_{opt}(k)=P_w^{-1}b_k, \quad (5)$$

which yields the maximum SIR $$SIR_k^{opt}=b_k^*P_w^{-1}b_k.$$

Of course, the base station does not know a priori the values for the scaled array responses $b_k$ or the spatial interference covariance matrix $P_w$, and therefore cannot directly compute the optimal weight vector $c_{opt}(k)$ from equation (5).

Instead, the adaptive antenna gain algorithm unit 126 estimates the optimal weight vector as follows. The input to the unit is the received signal y(t,n) for the symbol periods $t=1, 2, \ldots$ and tone indices $n=1, \ldots, N$. A tone selector block 130 selects the signal for each mobile station: $z(t,k)=y(t,\sigma(t,k))$ for $k=1, \ldots, K$.

Next, for each mobile station k, a covariance estimator 132 computes $\hat{P}_z(k)$, an estimate of the M×M spatial covariance matrix of the signal z(t,k). Any standard covariance estimator can be used. For example, after T symbols of data, the covariance estimator can use the empirical covariance estimate, $$\hat{P}_z(k) = \frac{1}{T}\sum_{t=1}^{T} z(t,k)z(t,k)^*. \quad (6)$$

A "forgetting factor" could also be added for time-varying channels, in a manner well known in the art. The matrix $\hat{P}_z(k)$ is called a "spatial" covariance matrix estimate, since the matrix describes the correlation between the signals received at the antenna elements in different spatial locations.

At the same time, additional covariance estimators 134 compute spatial covariance matrix estimates for each of the signals $y(t,n)$, $n=1, \ldots, N$. The resulting N spatial covariance matrix estimates are then averaged in an averaging unit 136 to obtain an M×M average received spatial covariance estimate $\hat{P}_y$. If an empirical covariance estimate is used for each signal, $y(t,n)$, in a manner similar to equation (6), the resulting average spatial covariance estimate is given by $$\hat{P}_y = \frac{1}{TN}\sum_{t=1}^{T}\sum_{n=1}^{N} y(t,n)y(t,n)^*.$$

Using the spatial covariance matrix estimates $\hat{P}_z(k)$, $k=1, \ldots, K$, and $\hat{P}_y$, an interference matrix and array response solver 140 computes estimates $\hat{b}_k$ for the scaled vector array response $b_k$, and estimates $\hat{P}_w$ for the interference spatial covariance matrix $P_w$. This block exploits a certain relation between the signal covariances, $\hat{P}_z(k)$ and $\hat{P}_y$, and the desired quantities $b_k$ and $P_w$ that will be described below in conjunction with FIG. 6.

The final block of the system, an antenna weight selector 142, produces the antenna weight vectors: $c(t,k)=\hat{P}_w^{-1}\hat{b}_k$ for $k=1, \ldots, K$, which is a natural estimate of the optimal weight vector in equation (5).

Figure 6:
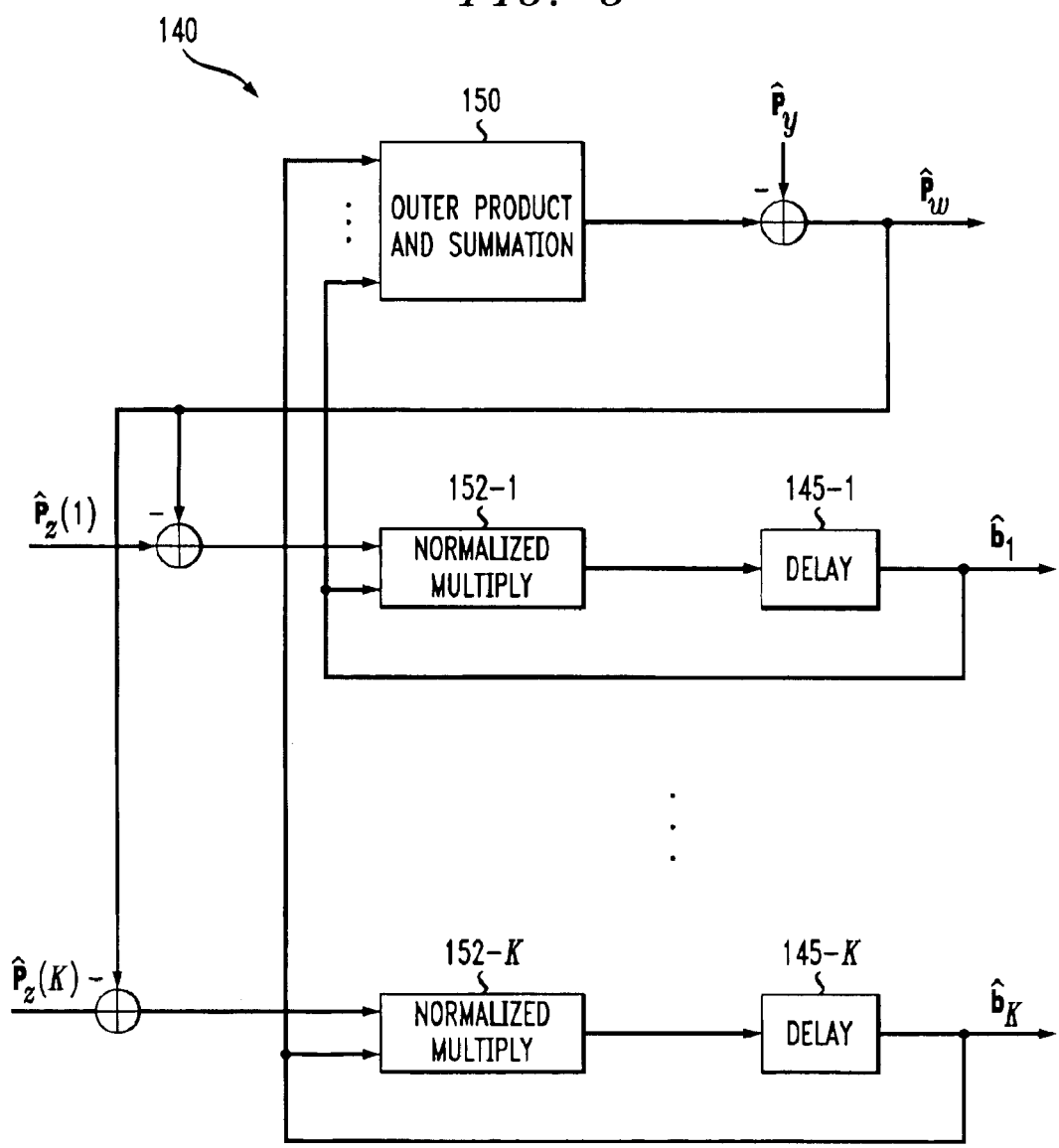
FIG. 6 shows one possible implementation of an interference matrix and array response solver in the diagram of FIG. 5.

FIG. 6 shows one possible implementation of the interference matrix and array response solver 140 of FIG. 5. The interference matrix and array response solver 140 estimates the scaled vector array responses, $b_k$, and the interference spatial covariance matrix $P_w$, using the spatial covariance matrix estimates $\hat{P}_z(k)$, $k=1, \ldots, K$, and $\hat{P}_y$.

This estimation is based on the mathematical relationship, $$P_z(k)=b_k b_k^* + P_w, k=1, \ldots, K,$$

$$P_y = P_w + \frac{1}{N}\sum_{k=1}^{K} b_k b_k^*. \quad (7)$$

which can be derived from equations (1) and (2), and the statistical assumptions described above. The solver 140 in FIG. 6 estimates $b_k$ and $P_w$ by solving the equations (7) using the estimates $\hat{P}_z(k)$ and $\hat{P}_y$ in place of $P_z(k)$ and $P_y$.

The equations are solved by an approximate iterative method. In the iterative method, the estimates $\hat{b}_k$, $k=1, \ldots, K$, for the scaled array response vectors $b_k$ are stored in delay elements 145 and updated in each iteration. The update in each iteration is performed as follows. First, based on equation (7), the spatial interference covariance matrix is estimated by summing outer products, $\hat{b}_k \hat{b}_k^*$ in element 150 and then subtracting the sum from $\hat{P}_y$. This yields the estimate $$\hat{P}_w = \hat{P}_y - \frac{1}{N}\sum_{k=1}^{K} \hat{b}_k \hat{b}_k^*. \quad (8)$$

Next, for each $k=1, \ldots, K$, a normalized multiply unit 152 updates the vectors, $\hat{b}_k$, by the assignment, $$v_k \leftarrow (\hat{P}_z(k)-\hat{P}_w)\hat{b}_k,$$

$$\hat{b}_k \leftarrow v_k/\sqrt{v_k^*\hat{b}_k}. \quad (9)$$

The update described by equations (8) and (9) can be repeated for some fixed number, $N_{it}$, of times in each symbol period. In each symbol period, the most recent estimate for $\hat{P}_z(k)$ and $\hat{P}_y$ should be used during the update.

As an illustration of the operation of the above-described iterative algorithm, assume that the covariance estimators of FIG. 5 have converged such that $\hat{P}_z(k) \cong P_z(k)$ for all k, and $\hat{P}_y \cong P_y$. Also, assume that at some point $\hat{P}_w \cong P_w$. Then equation (7) shows that $\hat{P}_z(k)-\hat{P}_w \cong b_k b_k^*$. Therefore, repeating the assignment in (9) is equivalent to a power algorithm for finding the maximal eigenvectors of $\hat{P}_z(k)-\hat{P}_w$. Therefore if $\hat{P}_z(k)-\hat{P}_w \cong b_k b_k^*$, repeating (9) should make $\hat{b}_k \cong b_k$ for all k. With equation $\hat{b}_k \cong b_k$, (7) shows that (8) sets $\hat{P}_w \cong P_w$.

To begin the algorithm, the base station selects an initial guess for the estimates $\hat{P}_w$ and $\hat{b}_k$ for $k=1, \ldots, K$. For example, the base station could take $\hat{b}_k$ to be the largest singular vector of $\hat{P}_z(k)$, and $\hat{P}_w=0$.

The number, $N_{it}$, of algorithm iterations per data symbol period is an adjustable design parameter. Increasing $N_{it}$ improves the estimation of $\hat{P}_w$ and $\hat{b}_k$ from $\hat{P}_z(k)$ and $\hat{P}_y$. However, increasing $N_{it}$ also increases the computational load per symbol.

The above-described embodiments are illustrative only. In addition, the assumptions made above with regard to the description of the illustrative embodiments are for purposes of simplicity and clarity of illustration, and are not intended to limit the scope of the invention. The invention can be implemented in alternative embodiment in which these assumptions do not apply. Furthermore, many different types, arrangements and configurations of processing elements other than those described herein may be used to implement the invention. For example, the processing elements shown in FIGS. 4 through 6, or suitable subsets thereof, may be implemented at least in part in the form of one or more software programs stored in a base station memory or other storage device and executed by a base station processor. As another example, one or more of these processing elements may be implemented at least in part in special-purpose hardware or firmware elements, such as application-specific integrated circuits (ASICs), programmable logic devices, etc. These and other alternative embodiments within the scope of the appended claims will be readily apparent to those skilled in the art.

What is claimed is:

1. A method for providing adaptation of an antenna array in a base station associated with a cell of a cellular wireless communication system, comprising the steps of:

estimating a spatial covariance matrix for each of a plurality of mobile stations communicating with the base station, the spatial covariance matrix for a given one of the mobile stations being determined at least in part based on a unique hopping sequence of the mobile station and providing a correlation between signals received from the mobile station at different antenna elements within the antenna array;

processing the estimated spatial covariance matrices to generate an estimate of an interference matrix for the plurality of mobile stations;

estimating an array response for the given mobile station from the interference matrix;

processing the array response for the given mobile station to generate an antenna weighting associated with the given mobile station; and applying the antenna weighting to a signal received from the given mobile station in order to facilitate detection of a corresponding transmitted symbol.

2. The method of claim 1 wherein the cellular wireless system comprises an orthogonal frequency division multiplexed (OFDM) system with spread spectrum multiple access (SSMA).

3. The method of claim 1 wherein the antenna array comprises M antenna elements, and the spatial covariance matrices and the interference matrix each comprise an M×M matrix.

4. The method of claim 1 wherein the array response comprises a scaled array response vector.

5. The method of claim 1 further including the steps of selecting initial estimates for the interference matrix and the array responses for each of the plurality of mobile stations, and subsequently applying a designated number of iterations of an iterative algorithm to determine final estimates of the interference matrix and the array responses for each of the plurality of mobile stations.

6. The method of claim 1 wherein the step of estimating the spatial covariance matrix for each of the plurality of mobile stations further comprises computing a spatial covariance matrix $\hat{P}_z(k)$ of a signal $z(t,k)=y(t,\sigma(t,k))$, where t denotes a particular symbol period, $k=1, \ldots K$ denotes a particular one of K mobile stations communicating with the base station within the symbol period, $y(t,n)$ denotes the received signal for symbol period t and tone index $n=1, \ldots N$, and $\sigma(t,k)$ denotes the unique hopping sequence for the kth mobile station.

7. The method of claim 6 wherein the spatial covariance matrix $\hat{P}_z(k)$ is estimated for the kth mobile station after receipt of T symbols of data in accordance with the following equation:

$$\hat{P}_z(k) = \frac{1}{T}\sum_{t=1}^{T} z(t,k)z(t,k)^*.$$

8. The method of claim 6 further including the steps of estimating a spatial covariance matrix for each of the signals $y(t,n)$, $n=1, \ldots, N$, and then averaging the resulting N estimated spatial covariance matrices to obtain an estimated M×M average received spatial covariance matrix $\hat{P}_y$.

9. The method of claim 6 wherein the estimated average received spatial covariance matrix $\hat{P}_y$ is estimated after receipt of T symbols of data in accordance with the following equation:

$$\hat{P}_y = \frac{1}{TN}\sum_{t=1}^{T}\sum_{n=1}^{N} y(t,n)y(t,n)^*.$$

10. The method of claim 6 wherein the estimated spatial covariance matrices $\hat{P}_z(k)$, $k=1, \ldots, K$, and the average received spatial covariance matrix $\hat{P}_y$ are processed to compute estimates $\hat{b}_k$ for a scaled array response vector $b_k$, and an estimate $\hat{P}_w$ for an interference spatial covariance matrix $P_w$.

11. The method of claim 10 wherein the step of processing the array response for the given mobile station to generate an antenna weighting associated with the given mobile station further includes generating a set of antenna weight vectors $c(t,k)=\hat{P}_w^{-1}\hat{b}_k$ for $k=1, \ldots, K$.

12. The method of claim 10 wherein the estimates for the array response $b_k$ and the interference spatial covariance matrix $P_w$ are determined by solving the following equations $$P_z(k)=b_k b_k^* + P_w, k=1, \ldots, K,$$

$$P_y = P_w + \frac{1}{N}\sum_{k=1}^{K} b_k b_k^*.$$

with the estimates $\hat{P}_z(k)$ and $\hat{P}_y$ inserted in place of $P_z(k)$ and $P_y$ and using an approximate iterative algorithm.

13. The method of claim 12 wherein the iterative algorithm updates stored estimates $\hat{b}_k$, $k=1, \ldots, K$, for the scaled array response vectors $b_k$ in each iteration.

14. The method of claim 13 wherein the update is performed in each iteration by first estimating the interference spatial covariance matrix by summing outer products $\hat{b}_k \hat{b}_k^*$ and then subtracting the sum from $\hat{P}_y$ to yield the estimate $$\hat{P}_w = \hat{P}_y - \frac{1}{N}\sum_{k=1}^{K} \hat{b}_k \hat{b}_k^*.$$

and then, for each $k=1, \ldots, K$, updating the vectors $\hat{b}_k$ by the assignment $$v_k \leftarrow (\hat{P}_z(k)-\hat{P}_w)\hat{b}_k,$$

$$\hat{b}_k \leftarrow v_k/\sqrt{v_k^*\hat{b}_k}.$$

15. An apparatus for use in a base station associated with a cell of a cellular wireless communication system and having an antenna array, the apparatus comprising:

a base station receiver coupled to the antenna array and operative: (i) to estimate a spatial covariance matrix for each of a plurality of mobile stations communicating with the base station, the spatial covariance matrix for a given one of the mobile stations being determined at least in part based on a unique hopping sequence of the mobile station and providing a correlation between signals received from the mobile station at different antenna elements within the antenna array; (ii) to process the estimated spatial covariance matrices to generate an estimate of an interference matrix for the plurality of mobile stations; (iii) to estimate an array response for the given mobile station from the interference matrix; (iv) to process the array response for the given mobile station to generate an antenna weighting associated with the given mobile station; and (v) to apply the antenna weighting to a signal received from the given mobile station in order to facilitate detection of a corresponding transmitted symbol.

16. An apparatus for providing adaptation of an antenna array in a base station associated with a cell of a cellular wireless communication system, the apparatus comprising:

means for estimating a spatial covariance matrix for each of a plurality of mobile stations communicating with the base station, the spatial covariance matrix for a given one of the mobile stations being determined at least in part based on a unique hopping sequence of the mobile station and providing a correlation between signals received from the mobile station at different antenna elements within the antenna array;

means for processing the estimated spatial covariance matrices to generate an estimate of an interference matrix for the plurality of mobile stations;

means for estimating an array response for the given mobile station from the interference matrix;

means for processing the array response for the given mobile station to generate an antenna weighting associated with the given mobile station; and means for applying the antenna weighting to a signal received from the given mobile station in order to facilitate detection of a corresponding transmitted symbol.

17. A method for providing adaptation of an antenna array in a base station associated with a cell of a cellular wireless communication system, comprising the steps of:

determining a spatial covariance matrix for each of a plurality of mobile stations communicating with the base station, the spatial covariance matrix for a given one of the mobile stations being determined at least in part based on a unique hopping sequence of the mobile station and providing a correlation between signals received from the mobile station at different antenna elements within the antenna array; and processing the estimated spatial covariance matrices to determine an antenna weighting associated with the given mobile station;

wherein the antenna weighting is applied to a signal received from the given mobile station in order to facilitate detection of a corresponding transmitted symbol; and wherein the unique hopping sequence specifies for the given mobile station a hopping between tones of a plurality of orthogonal frequency division multiplexed tones, each of the mobile stations being assigned one or more of the tones for use in conjunction with transmission of a corresponding symbol, the tone assignments being changed for the mobile stations on a symbol-by-symbol basis.

18. An apparatus for use with a base station associated with a cell of a cellular wireless communication system and having an antenna array, the apparatus comprising:

a base station receiver coupled to the antenna array and operative: (i) to determine a spatial covariance matrix for each of a plurality of mobile stations communicating with the base station, the spatial covariance matrix for a given one of the mobile stations being determined at least in part based on a unique hopping sequence of the mobile station and providing a correlation between signals received from the mobile station at different antenna elements within the antenna array; and (ii) to process the estimated spatial covariance matrices to determine an antenna weighting associated with the given mobile station;

wherein the antenna weighting is applied to a signal received from the given mobile station in order to facilitate detection of a corresponding transmitted symbol; and wherein the unique hopping sequence specifies for the given mobile station a hopping between tones of a plurality of orthogonal frequency division multiplexed tones, each of the mobile stations being assigned one or more of the tones for use in conjunction with transmission of a corresponding symbol, the tone assignments being changed for the mobile stations on a symbol-by-symbol basis.

19. An apparatus for providing adaptation for an antenna array of a base station associated with a cell of a cellular wireless communication system, the apparatus comprising:

means for determining a spatial covariance matrix for each of a plurality of mobile stations communicating with the base station, the spatial covariance matrix for a given one of the mobile stations being determined at least in part based on a unique hopping sequence of the mobile station and providing a correlation between signals received from the mobile station at different antenna elements within the antenna array;

means for processing the estimated spatial covariance matrices to determine an antenna weighting associated with the given mobile station; and weight applying means for applying the antenna weighting to a signal received from the given mobile station in order to facilitate detection of a corresponding transmitted symbol;

wherein the unique hopping sequence specifies for the given mobile station a hopping between tones of a plurality of orthogonal frequency division multiplexed tones, each of the mobile stations being assigned one or more of the tones for use in conjunction with transmission of a corresponding symbol, the tone assignments being changed for the mobile stations on a symbol-by-symbol basis.

20. An apparatus for use with a base station associated with a cell of a cellular wireless communication system and having an antenna array, the apparatus comprising:

a processor operative: (i) to determine a spatial covariance matrix for each of a plurality of mobile stations communicating with the base station, the spatial covariance matrix for a given one of the mobile stations being determined at least in part based on a unique hopping sequence of the mobile station and providing a correlation between signals received from the mobile station at different antenna elements within the antenna array; and (ii) to process the estimated spatial covariance matrices to determine an antenna weighting associated with the given mobile station;

wherein the antenna weighting is applied to a signal received from the given mobile station in order to facilitate detection of a corresponding transmitted symbol, and wherein the unique hopping sequence specifies for the given mobile station a hopping between tones of a plurality of orthogonal frequency division multiplexed tones, each of the mobile stations being assigned one or more of the tones for use in conjunction with transmission of a corresponding symbol, the tone assignments being changed for the mobile stations on a symbol-by-symbol basis.

* * * * *